United States Patent
Eum et al.

[11] Patent Number: 6,157,472
[45] Date of Patent: Dec. 5, 2000

[54] MULTI-LASER SCANNING UNIT

[75] Inventors: Jae-yong Eum, Suwon; Hwan-young Choi, Anyang; Sung-min Cho, Seoul; Moon-gyu Lee, Suwon; Jee-hong Min; Young-il Kim, both of Yongin, all of Rep. of Korea

[73] Assignee: Samsung Electronics Co., Ltd., Kyungki-Do, Rep. of Korea

[21] Appl. No.: 09/422,348

[22] Filed: Oct. 21, 1999

[30] Foreign Application Priority Data

Oct. 23, 1998 [KR] Rep. of Korea ............... 98-44569

[51] Int. Cl.$^7$ .................................................. G02B 5/32
[52] U.S. Cl. .................... 359/18; 359/17; 359/201; 359/209; 347/243
[58] Field of Search ............... 359/17, 18, 204, 359/209; 235/457; 347/241, 243

[56] References Cited

U.S. PATENT DOCUMENTS

| | | |
|---|---|---|
| 4,026,630 | 5/1977 | Wollenmann . |
| 4,761,046 | 8/1988 | Funato ........................................ 359/18 |
| 4,782,228 | 11/1988 | Westell ..................................... 250/236 |
| 5,295,004 | 3/1994 | Hasegawa et al. ........................ 359/17 |

FOREIGN PATENT DOCUMENTS

| | | |
|---|---|---|
| 2284127 | 4/1976 | France . |
| 3446354 | 6/1986 | Germany . |

OTHER PUBLICATIONS

John Howard: "Novel scanning interferometer for two–dimensional plasma density measurements", Review of Scientific Instruments, vol. 61, No. 3, Mar. 1990 pp. 1086–1094.

Patent Abstracts of Japan, vol. 7, No. 164, Jul. 19, 1983 and JP 58 072121 A, Apr. 30, 1983. *abstract*.

*Primary Examiner*—Darren Schuberg
*Attorney, Agent, or Firm*—Sughrue, Mion, Zinn, Macpeak & Seas, PLLC

[57] ABSTRACT

A multi-laser scanning unit (LSU) in which scanning lines incident parallel onto a photoreceptor have the same scanning direction. The multi-laser scanning unit includes: a driving source for providing a rotatory force; a deflection disk installed around a rotary shaft of the driving source having at least two sectors with a hologram pattern for diffracting and deflecting incident light, for scanning light through rotation; at least two light sources installed facing one surface of the deflection disk for irradiating light lines onto predetermined points in the at least two sectors of the deflection disk, the predetermined points are symmetrical by the rotary center of the deflection disk; a light path changing portion for changing traveling paths of the plurality of scanning lines formed by the rotation of the deflection disk, such that the centers of the scanning lines or extended imaginary lines of the scanning lines pass the rotary axis of the deflection disk; and a scanning direction changing portion for changing the scanning direction of one scanning line scanned by the deflection disk in the opposite scanning direction, such that all the scanning lines scan an image in the same scanning direction.

4 Claims, 8 Drawing Sheets

MULTI-LASER SCANNING UNIT

BACKGROUND OF THE INVENTION

1. Field of the Invention

The present invention relates to a multi-laser scanning unit (LSU) capable of diffracting and scanning light incident from at least two light sources, and more particularly, to a multi-LSU in which a plurality of scanning lines (rays) incident parallel onto a photoreceptor are also directionally the same.

2. Description of the Related Art

In general, a multi-LSU is adopted in a color printer and is used to form a plurality of latent electrostatic images required to develop a color image in combination with a plurality of colors including yellow (Y), magenta (M), cyan (C), black (K) and the like. In this case, a plurality of scanning lines scanned by the multi-LSU and incident onto a photoreceptor such as a photosensitive belt or photosensitive drum, must be parallel at predetermined intervals, such that scanning directions of the plurality of scanning lines are parallel to each other.

Referring to FIGS. 1 through 3, a conventional multi-LSU capable of generating four scanning lines corresponding to the colors Y, M, C and K, includes a driving source 11 for providing a rotatory force, a deflection disk 15 having a plurality of sectors each with a hologram pattern 15a, and a light source unit 20 which is arranged facing one surface of the deflection disk 15 and which radiates light onto the deflection disk 15. The light source unit 20 includes four light sources 21, 23, 25 and 27, which irradiate light onto four incident points $S_1$, $S_2$, $S_3$ and $S_4$, respectively, wherein each pair of points adjacent to each other form a right angle at the rotary center of the deflection disk 15. Also, the four incident points Si, $S_2$, $S_3$ and $S_4$, are positioned with equal radii from the rotary center of the deflection disk 15. Thus, the centers of the scanning lines formed by the deflection disk 15 pass the center of the deflection disk 15, thereby reducing the off-axis.

The incident light lines are diffracted by the hologram patterns 15a by rotation of the deflection disk 15 and form scanning lines $L_{11}$, $L_{21}$, $L_{31}$ and $L_{41}$ in the directions indicated by the arrow (→). Here, the scanning lines $L_{11}$ and $L_{31}$ are parallel (to the Y-axis) and are opposite in direction. Also, the scanning lines $L_{21}$ and $L_{41}$, perpendicular to the scanning lines $L_{11}$ and $L_{31}$, are parallel (to the X-axis) and are opposite in direction.

Traveling paths of the scanning lines $L_{11}$, $L_{21}$, $L_{31}$ and $L_{41}$, are changed by a plurality of mirrors such that the centers of the scanning lines travel along the X-axis. That is, the scanning line $L_{11}$ is reflected by a mirror $M_1$ to travel in the X-axis direction, and the scanning line $L_{21}$ is reflected by a mirror $M_{21}$ toward the rotary center of the deflection disk 15 and then reflected again by a mirror $M_{22}$ positioned on the rotary center of the deflection disk 15 to travel in the X-axis direction. Also, the scanning line $L_{31}$ is reflected by a mirror $M_3$ to travel in the X-axis direction, and the scanning line $L_{41}$ is reflected by a mirror $M_{41}$ toward the rotary center of the deflection disk 15 and is reflected again by a mirror $M_{42}$ positioned on the rotary center of the deflection disk 15 to travel in the X-axis direction.

Scanning directions of scanning lines $L_{12}$, $L_{22}$, $L_{32}$ and $L_{42}$, scanning in the X-axis direction after being reflected by the mirrors $M_1$, $M_{21}$, $M_{22}$, $M_3$, $M_{41}$ and $M_{42}$, are indicated by the arrow (→) in FIG. 2. As shown in FIG. 2, the scanning lines $L_{12}$, $L_{22}$ and $L_{42}$ have the same scanning directions, but the direction of the scanning line $L_{32}$ is opposite to that of the scanning lines $L_{12}$, $L_{22}$ and $L_{42}$.

That is, in the case of using a plurality of mirrors and post-holographic optical elements to change the traveling path of the light, after being reflected by the mirrors $M_1$, $M_{22}$, $M_3$ and $M_{42}$, the plurality of scanning lines are parallel in scanning directions for a photoreceptor, but the direction of the scanning line $L_{32}$ is still opposite to that of the others.

Thus, when forming an image on the photoreceptor, image information must be compensated for in the circuitry due to the different scanning directions. That is, the light source 25 providing the scanning line $L_{32}$ must transfer the image data in the opposite direction to match image provided by the remaining light sources 21, 23 and 27. That is, there is a disadvantage in that the light sources 21, 23 and 27 provide image information in the direction indicated by ⊗ while the light source 25 provides image information in the direction indicated by ⊙ as shown in FIG. 3, so that image data processing is complicated.

SUMMARY OF THE INVENTION

To solve the above problem, it is an object of the present invention to provide a multi-laser scanning unit (LSU) in which the centers of a plurality of scanning lines formed by a deflection disk pass the rotary center of the deflection disk, and are parallel in the same scanning direction.

Accordingly, to achieve the above object, there is provided a multi-laser scanning unit (LSU) comprising: a driving source for providing a rotatory force; a deflection disk installed around a rotary shaft of the driving source having at least two sectors with a hologram pattern for diffracting and deflecting incident light, for scanning light through rotation; at least two light sources installed facing one surface of the deflection disk for irradiating light lines onto predetermined points in the at least two sectors of the deflection disk, the predetermined points being symmetrical by the rotary center of the deflection disk; a light path changing means for changing traveling paths of the plurality of scanning lines formed by the rotation of the deflection disk, such that the centers of the scanning lines or extended imaginary lines of the scanning lines pass the rotary axis of the deflection disk; and a scanning direction changing means for changing the scanning direction of one scanning line scanned by the deflection disk in the opposite scanning direction, such that all the scanning lines scan an image in the same scanning direction.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
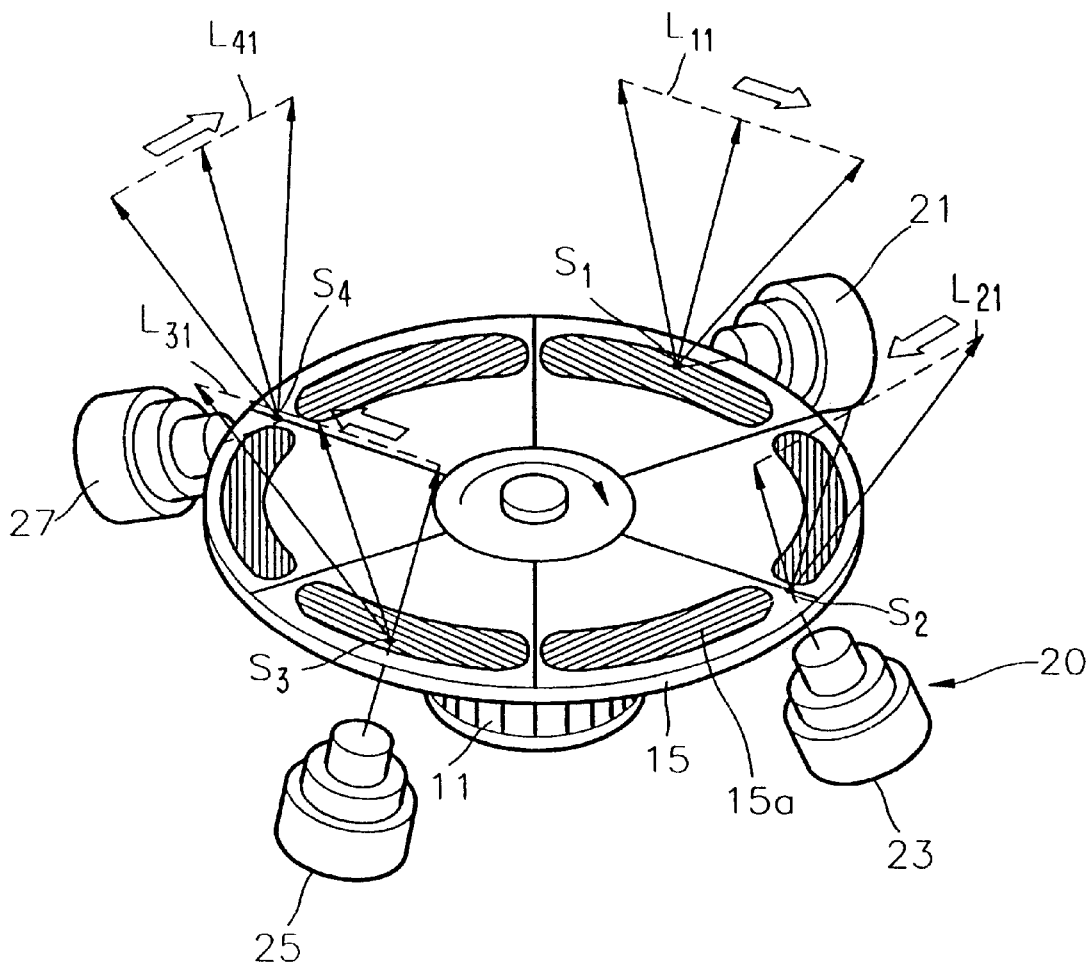
FIG. 1 is a schematic perspective view of the main portions of a conventional multi-laser scanning unit (LSU)
Figure 1:
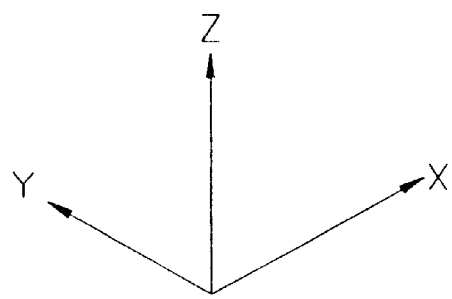
Figure 2:
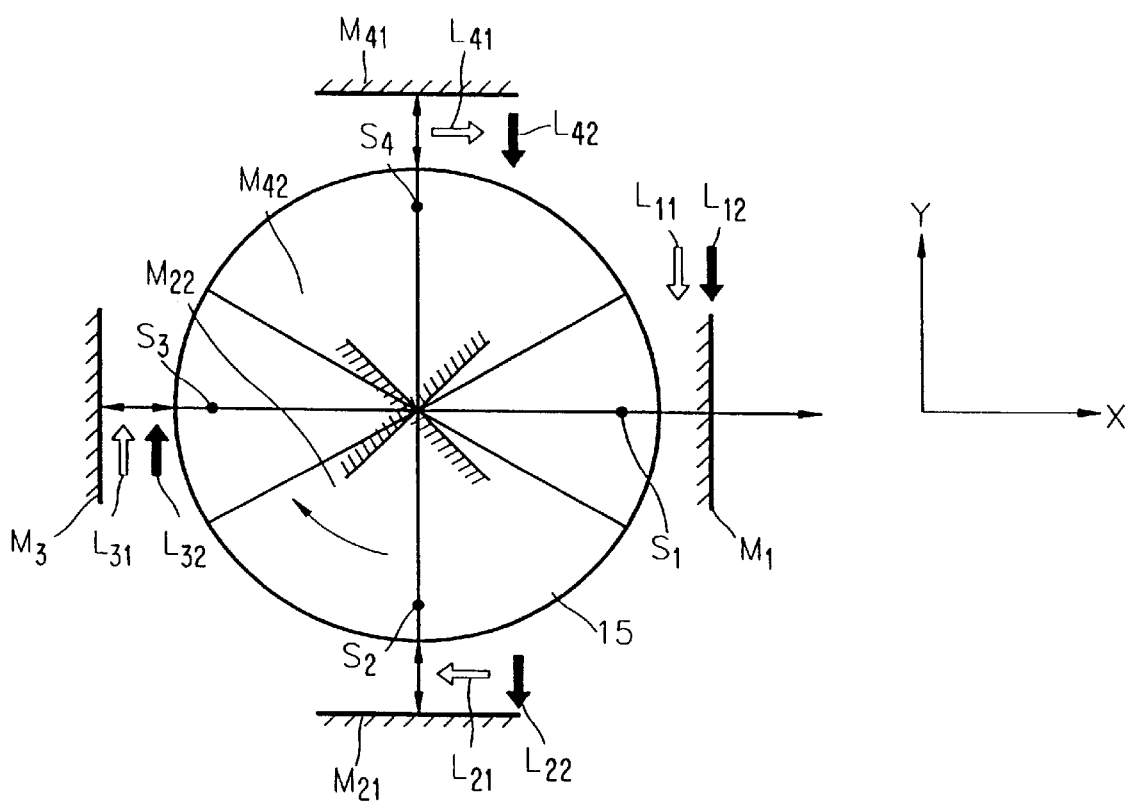
FIG. 2 is a plan view showing the optical arrangement of the conventional multi-LSU for parallel scanning lines.

Referring to FIGS. 4 through 8, a multi-laser scanning unit (LSU) according to the present invention includes a driving source 31 for providing a rotatory force, a deflection disk 35 having a plurality of sectors each with a hologram pattern 35a, a light source unit 40 which is arranged facing the bottom of the deflection disk 35 and irradiates beams onto the deflection disk 35, a light path changing means for changing a traveling direction of the light diffracted and scanned by the deflection disk 35, and a scanning direction changing means 50 for changing the scanning direction of one scanning line scanned in the opposite direction.

The light source unit 40 includes four light sources 41, 43, 45 and 47, corresponding to four colors, yellow (Y), magenta (M), cyan (C) and black (K) for four scanning lines. The light lines irradiated by the four light sources 41, 43, 45 and 47 are incidents onto incident points $S_1'$, $S_2'$, $S_3'$ and $S_4'$, of the deflection disk 35. Here, the incident points $S_1'$, $S_2'$, $S_3'$ and $S_4'$, form circles of the same radii R centered around the rotary center of the deflection disk 35, and form a right angle with adjacent incident points at the rotary center of the deflection disk.

Figure 5:
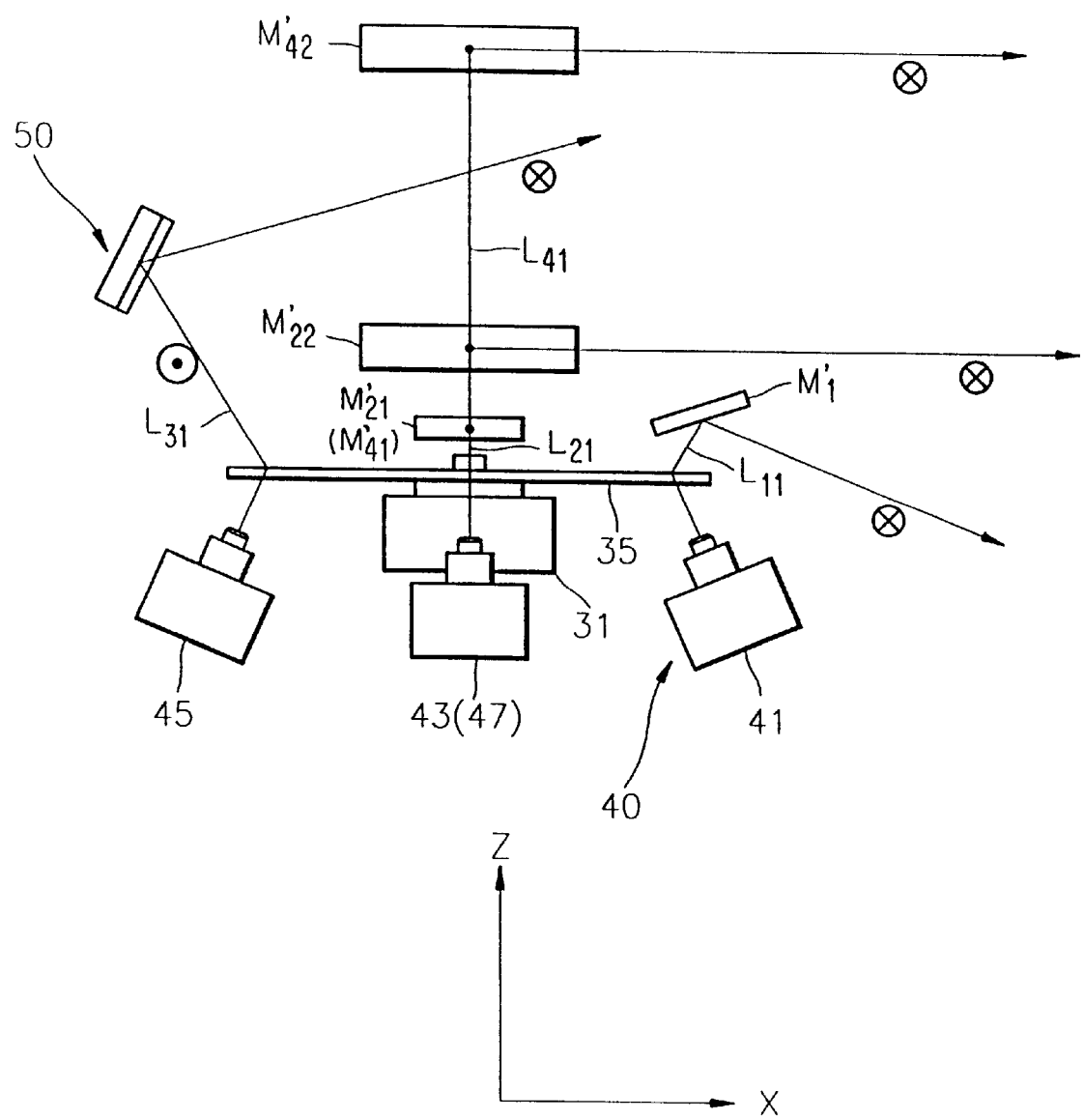
FIG. 5 is a plan view showing the multi-LSU shown in FIG. 4.
Figure 6:
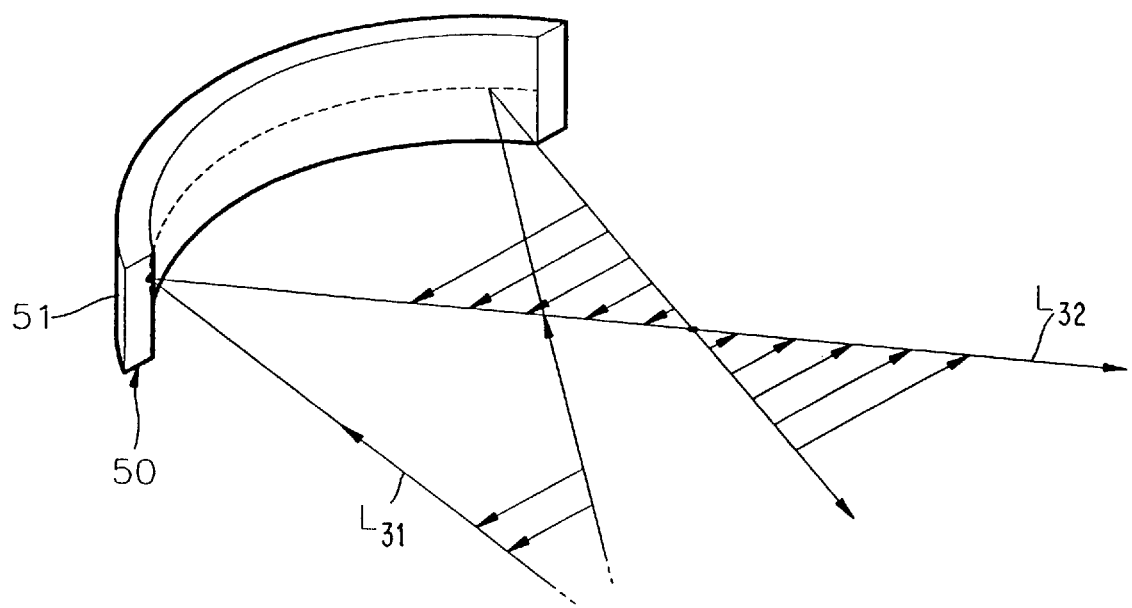
FIG. 6 is a schematic perspective view of the cylindrical concave mirror of FIG. 5.
Figure 6:
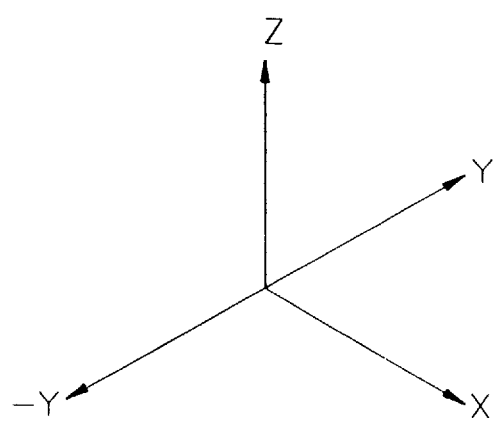
Figure 7:
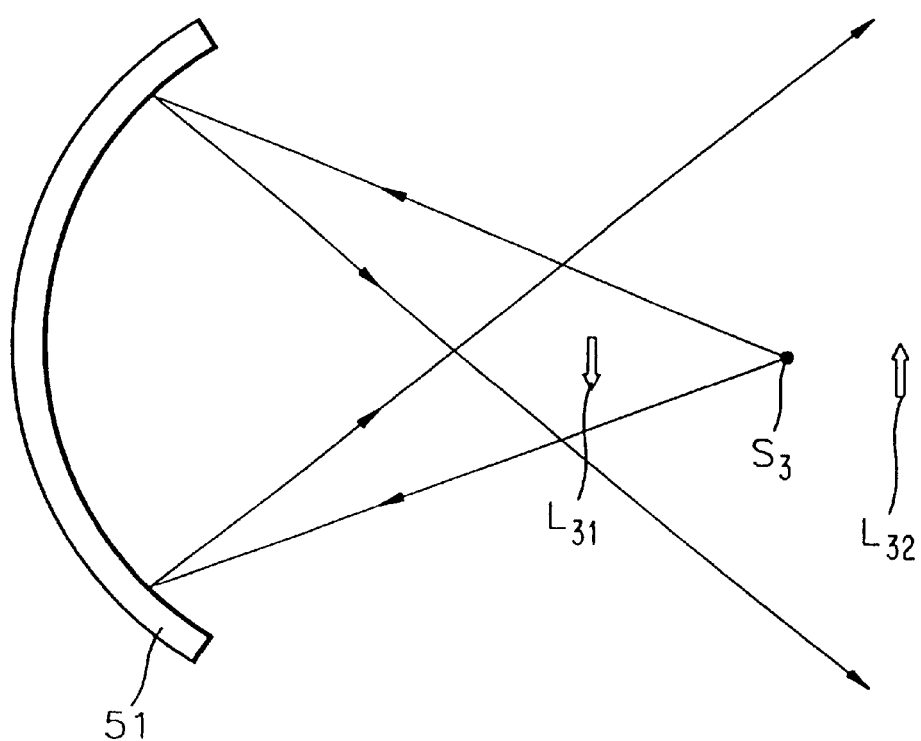
FIG. 7 is a plan view of FIG. 6.
Figure 8:
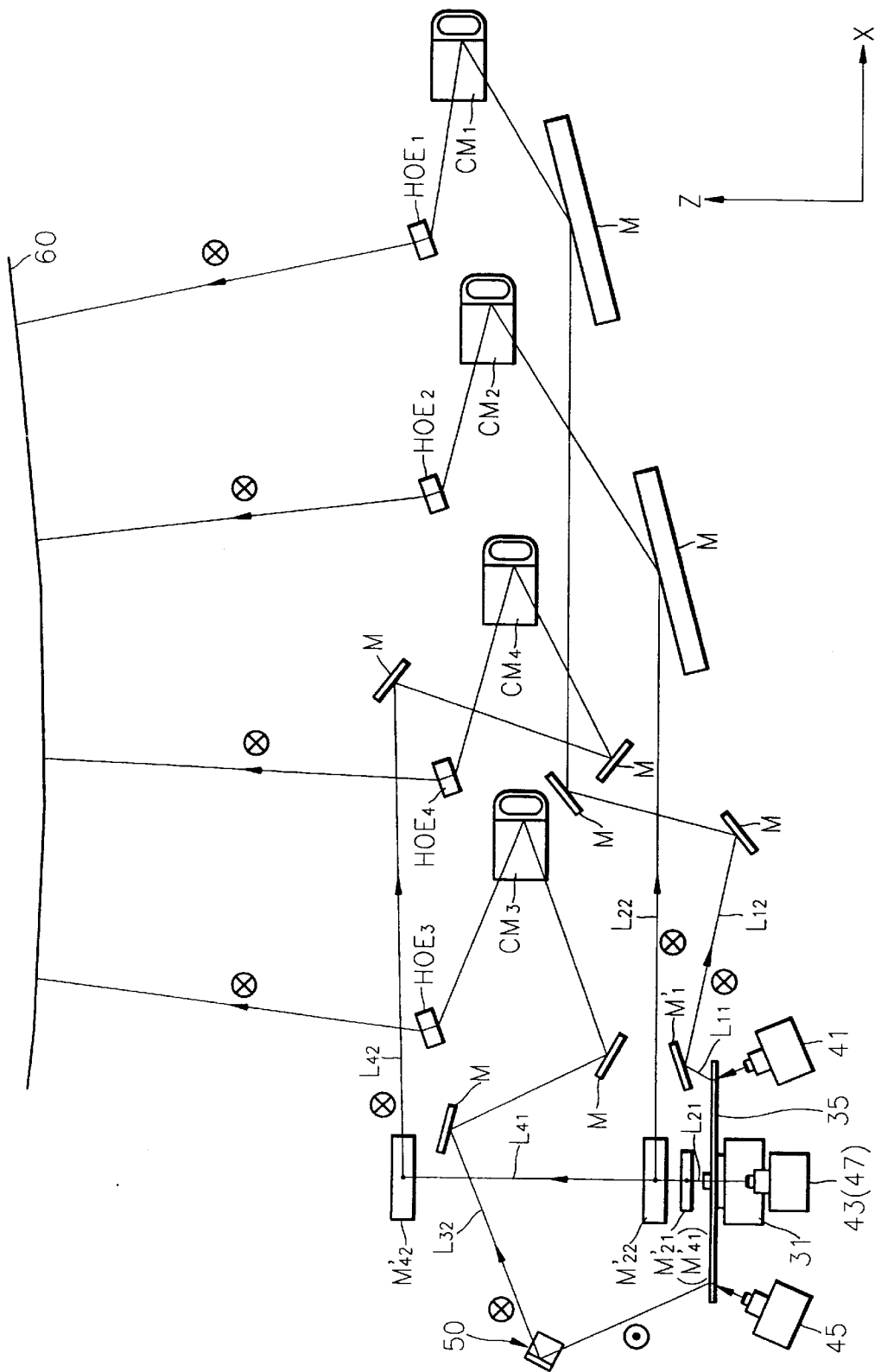
FIG. 8 is a schematic view showing the optical arrangement of the multi-LSU according to the present invention.

The scanning lines $L_1$, $L_2$, $L_3$ and $L_4$, are diffracted and scanned by the deflection disk 35 in the direction indicated by the arrow (→) and then the light traveling path is changed by the light path changing means such that the centers of the scanning lines $L_{11}$, $L_{21}$, $L_{31}$ and $L_{41}$, travel along the X-axis. Here, the light path changing means includes a plurality of planar mirrors $M_1'$, $M_{21}'$, $M_{22}'$ $M_{41}'$ and $M_{42}'$. The scanning line $L_{11}$ is reflected by the planar mirror $M_1'$ such that the center of the scanning line travels in the X-axis direction and the scanning line $L_{21}$ is reflected by the mirror $M_{21}'$ toward the rotary center of the deflection disk 35 and then reflected again by the mirror $M_{22}'$ positioned at the rotary center of the deflection disk to travel in the X-axis direction. Also, the scanning line $L_{41}$ is reflected again by the mirror $M_{42}'$ positioned at the rotary center of the deflection disk 35 to travel in the X-axis direction. Here, the scanning lines $L_{11}$, $L_{21}$ and $L_{41}$, are scanned in the direction indicated by ⊗ while the scanning line $L_{31}$ is scanned in the direction indicated by ⊙ as shown in FIG. 5. Thus, the scanning direction changing means 50 is placed on the optical path of the scanning line $L_{31}$ so as to change the scanning direction of the scanning line $L_{31}$ to the direction indicated by ⊗ as shown in FIG. 5.

Figure 3:
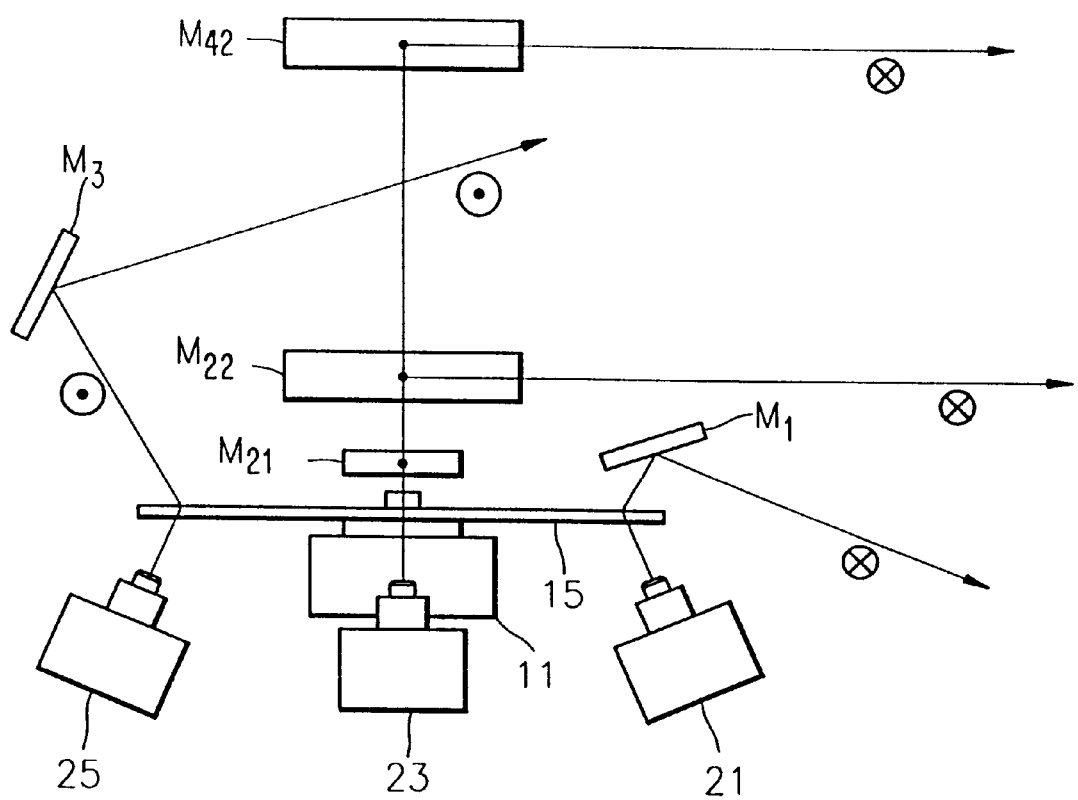
FIG. 3 is a side view of FIG. 2.
Figure 4:
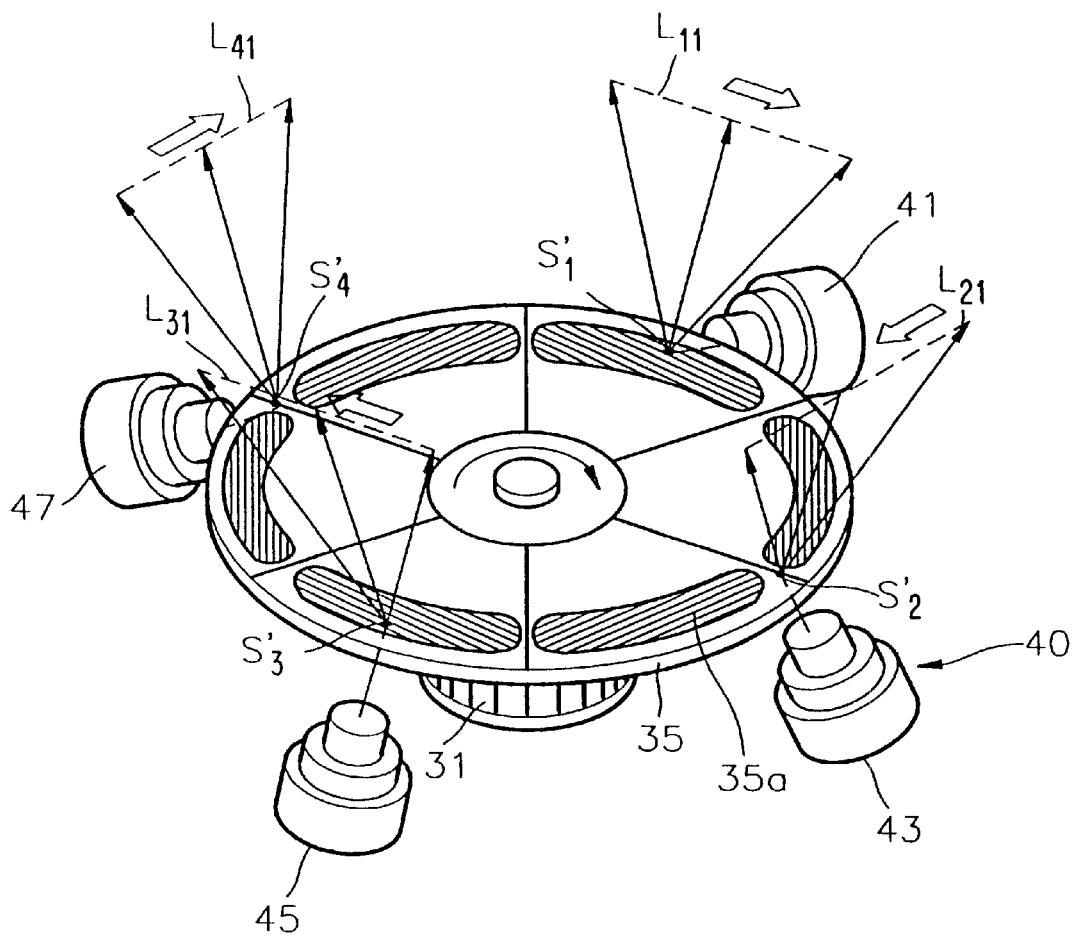
FIG. 4 is a schematic perspective view of the main portions of a multi-LSU according to a preferred embodiment of the present invention.

Preferably, the scanning direction changing means 50 is a cylindrical concave mirror 51, which is concave in the scanning direction. The concave mirror 51 converges the scanning line $L_{31}$ scanned in the -Y-axis direction (direction indicated by the arrow ↓ in FIG. 7) from the incident point $S_3$ of the deflection disk 35, and diverges the scanning line $L_{32}$ in the Y-axis direction (direction indicated by the arrow ○ in FIG. 7). Here, the curvature of the concave mirror 51 is determined in a range where the width of the diverging light is equal to that of the scanning line reflected by the mirror $M_3$ (see FIG. 3).

The scanning line $L_{41}$ is reflected by the mirror $M_{41}'$ toward the center of the deflection disk 35 and then reflected again by the mirror $M_{42}'$ positioned at the rotary center of the reflection disk to travel in the X-axis. Here, the mirrors $M_{21}'$, $M_{22}'$, $M_{41}'$ and $M_{42}'$, are substantially the same as those of the mirrors $M_{21}$, $M_{22}$, $M_{41}$, and $M_{42}$, thus detailed explanation thereof will be omitted.

Thus, scanning lines $L_{12}$, $L_{22}$, $L_{32}$ and $L_{42}$, obtained after reflection by the mirrors $M_1'$, $M_{22}'$ and $M_{42}'$, and the concave mirror 51, respectively, travel in the same scanning direction indicated by ⊗ for an image formed on a photoreceptor 60.

Preferably, the light path changing means further comprises a plurality of planar mirrors M other than the mirrors $M_1'$, $M_{22}'$ and $M_{42}'$, curved mirrors $CM_1$, $CM_2$, $CM_3$ and $CM_4$, and holographic optical elements $HOE_1$, $HOE_2$, $HOE_3$ and $HOE_4$, so as to scan the plurality of scanning lines parallel on the image of the photoreceptor 60.

The planar mirrors M reflects four scanning lines $L_{12}$, $L_{22}$, $L_{32}$ and $L_{42}$, reflected by the mirrors $M_1'$, $M_{22}'$ and $M_{42}'$, and the concave mirror 51, respectively, to serve the light traveling paths corresponding to each of the scanning regions in the image.

The curved mirrors $CM_1$, $CM_2$, $CM_3$ and $CM_4$, converge and reflect the scanning lines incident via the plurality of the planar mirrors M such that the scanning lines become parallel, and correct bowing of the scanning lines which is due to diffraction of the incident light by the hologram pattern and rotation of the deflection disk 35.

The holographic optical elements $HOE_1$, $HOE_2$, $HOE_3$ and $HOE_4$ diffract and transmit the incident scanning lines at a predetermined angle such that the scanning lines go toward the photoreceptor 60 to be incident at a nearly right angle onto the photoreceptor 60.

In the multi-LSU according to the present invention, all the centers of the plurality of scanning lines formed by the deflection disk pass the rotary center of the deflection disk, so the optical arrangement of the mirrors is easy and the plurality of scanning lines travel in the same scanning directions.

Thus, because the main scanning directions of all the scanning lines are the same as the image formation directions, there is an advantage in that compensation for the image information within the circuitry is not necessary.

It is contemplated that numerous modifications may be made to the apparatus and procedure of the invention without departing from the spirit and scope of the invention as defined in the following claims.

What is claimed is:

1. A multi-laser scanning unit comprising:

a driving source for providing a rotatory force;

a deflection disk installed around a rotary shaft of the driving source, having at least two sectors with a hologram pattern for diffracting and deflecting incident light, for scanning light through rotation to result in a plurality of light scanning lines;

at least two light sources installed facing one surface of the deflection disk, for irradiating light lines onto predetermined points in the at least two sectors of the deflection disk, the predetermined points being symmetrical by a rotary center of the deflection disk;

light path changing means for changing traveling paths of the plurality of scanning lines formed by the rotation of the deflection disk, such that centers of the scanning lines or extended imaginary lines of the scanning lines, pass a rotary axis of the deflection disk; and scanning direction changing means for changing a scanning direction of one scanning line scanned by the deflection disk in an opposite scanning direction to said scanning direction, such that all the scanning lines scan an image in a same scanning direction.

2. The multi-laser scanning unit of claim 1, wherein the scanning direction changing means is a concave mirror arranged on a traveling path of the one incident scanning line scanned in the opposite scanning direction by the rotation of the deflection disk, and wherein the concave mirror changes the scanning direction by converging and diverging the incident scanning line.

3. The multi-laser scanning unit of claim 1, wherein the light path changing means comprises:

a plurality of planar mirrors for reflecting the plurality of scanning light lines scanned and deflected by the deflection disk to provide light traveling paths corresponding to each scan region of the image;

a plurality of curved mirrors for condensing and reflecting the light lines incident via the planar mirrors; and plurality of holographic optical elements for diffracting the scanning lines reflected by the curved mirrors.

4. The multi-laser scanning unit of claim 3, wherein the scanning direction changing means is a concave mirror arranged on a traveling path of an incident scanning line scanned in the opposite scanning direction by the rotation of the deflection disk, and wherein the concave mirror changes the scanning direction by converging and diverging the incident scanning line.

* * * * *